(12) United States Patent
Kimmet et al.

(10) Patent No.: US 9,128,792 B2
(45) Date of Patent: Sep. 8, 2015

(54) SYSTEMS AND METHODS FOR INSTALLING, MANAGING, AND PROVISIONING APPLICATIONS

(71) Applicants: Tim G. Kimmet, Los Gatos, CA (US); Ramana Venkatesh Sivasubramanian, Foster City, CA (US); Kenneth Hansen, San Francisco, CA (US)

(72) Inventors: Tim G. Kimmet, Los Gatos, CA (US); Ramana Venkatesh Sivasubramanian, Foster City, CA (US); Kenneth Hansen, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 101 days.

(21) Appl. No.: 13/631,203

(22) Filed: Sep. 28, 2012

(65) Prior Publication Data

US 2014/0096129 A1 Apr. 3, 2014

(51) Int. Cl.
*G06F 9/44* (2006.01)
*G06F 9/445* (2006.01)
*G06F 9/50* (2006.01)
*G06F 11/07* (2006.01)

(52) U.S. Cl.
CPC ............. *G06F 8/61* (2013.01); *G06F 9/5083* (2013.01); *G06F 11/0709* (2013.01); *G06F 11/079* (2013.01)

(58) Field of Classification Search
CPC ............. G06F 8/71; G06F 8/61; G06F 21/31; G06F 9/45533
See application file for complete search history.

(56) References Cited

U.S. PATENT DOCUMENTS

| | | | |
|---|---|---|---|
| 4,558,413 A | 12/1985 | Schmidt |
| 4,714,992 A | 12/1987 | Gladney |
| 4,763,271 A | 8/1988 | Field |
| 4,788,637 A | 11/1988 | Tamaru |
| 4,951,192 A | 8/1990 | Chase, Jr. |
| 5,019,963 A | 5/1991 | Alderson |
| 5,027,316 A | 6/1991 | Frantz |
| 5,155,837 A | 10/1992 | Liu |
| 5,155,847 A | 10/1992 | Kirouac |
| 5,193,185 A | 3/1993 | Lanter |
| 5,230,050 A | 7/1993 | Iitsuka |
| 5,237,688 A | 8/1993 | Calvert |
| 5,257,377 A | 10/1993 | Comparetta |

(Continued)

OTHER PUBLICATIONS

David Barrera et al; Secure Software Installation on Smartphones; 2011 IEEE; 8 pages; <http://people.scs.carleton.ca/~paulv/davidb.pdf>.*

(Continued)

*Primary Examiner* — Thuy Dao
*Assistant Examiner* — Cuong V Luu
(74) *Attorney, Agent, or Firm* — Allan W. Watts; Bryan Cave LLP

(57) ABSTRACT

Systems and methods are disclosed for provisioning resources for an application according to an application manifest. The resources may include database, network, and processing resources. The application manifest may be organized as a manifest tree with provisioned resources having their own application manifests for provisioning sub-resources. The application manifest may also define provisioning and de-provisioning of the application in response to loading of the application. Root cause analysis may be performed in accordance with the manifest tree. Also disclosed are systems and methods for rolling out an upgrade across a node cluster. Systems and methods are disclosed for routing traffic to different workflow paths in order to implement an overloaded path and evaluate performance of the overloaded path.

18 Claims, 12 Drawing Sheets

(56) References Cited

U.S. PATENT DOCUMENTS

| | | | |
|---|---|---|---|
| 5,313,387 | A | 5/1994 | Aki |
| 5,452,448 | A | 9/1995 | Fukuzawa |
| 5,561,800 | A | 10/1996 | Sabatella |
| 5,561,803 | A | 10/1996 | Kilis |
| 5,577,244 | A | 11/1996 | Killebrew |
| 5,613,101 | A | 3/1997 | Lillich |
| 5,666,501 | A | 9/1997 | Jones |
| 5,761,649 | A | 6/1998 | Hill |
| 5,787,280 | A | 7/1998 | Chen |
| 5,805,897 | A | 9/1998 | Glowny |
| 5,909,581 | A | 6/1999 | Park |
| 5,950,209 | A | 9/1999 | Carrier, III |
| 5,970,503 | A | 10/1999 | Eisenberg |
| 6,151,643 | A | 11/2000 | Cheng |
| 6,182,286 | B1 | 1/2001 | Sigal |
| 6,199,204 | B1 | 3/2001 | Donohue |
| 6,202,207 | B1 | 3/2001 | Donohue |
| 6,240,550 | B1 | 5/2001 | Nathan |
| 6,272,536 | B1 | 8/2001 | van Hoff |
| 6,327,617 | B1 | 12/2001 | Fawcett |
| 6,351,752 | B1 | 2/2002 | Cousins |
| 6,367,077 | B1 | 4/2002 | Brodersen |
| 6,425,126 | B1 | 7/2002 | Branson |
| 6,457,076 | B1 | 9/2002 | Cheng |
| 6,457,170 | B1 | 9/2002 | Boehm |
| 6,968,550 | B2 | 11/2005 | Branson |
| 6,981,252 | B1 | 12/2005 | Sadowsky |
| 7,062,765 | B1 | 6/2006 | Pitzel |
| 8,296,758 | B2 * | 10/2012 | Kabadiyski ............ 717/174 |
| 8,347,263 | B1 * | 1/2013 | Offer ................... 717/104 |
| 2005/0166196 | A1 * | 7/2005 | Grier et al. ............ 717/162 |
| 2006/0026591 | A1 * | 2/2006 | Backhouse et al. ...... 717/177 |
| 2007/0233782 | A1 | 10/2007 | Tali |
| 2008/0201705 | A1 * | 8/2008 | Wookey ................ 717/175 |
| 2008/0301637 | A1 * | 12/2008 | Stark ................... 717/120 |
| 2009/0276769 | A1 * | 11/2009 | Brannen et al. ........ 717/174 |
| 2012/0266156 | A1 * | 10/2012 | Spivak et al. .......... 717/172 |
| 2013/0219383 | A1 * | 8/2013 | Hilerio et al. .......... 717/178 |
| 2013/0283259 | A1 * | 10/2013 | Ellis et al. ............. 717/174 |

OTHER PUBLICATIONS

Alan Dearle; Software Deployment, Past, Present and Future; 2007 IEEE; pp. 269-284; <http://dl.acm.org/citation.cfm?id=1254724>.*

Carl Staelin; mkpkg A software packaging tool; 1998 usenix.org; 18 pages; <http://static.usenix.org/legacy/publications/library/proceedings/lisa98/full_papers/staelin/staelin_html/staelin.html>.*

Vincent Lestideau et al.; Providing Highly Automated and Generic Means for Software Deployment Process; 2003 Springer; pp. 128-142; <http://link.springercom/chapter/10.1007/978-3-540-45189-1_10>.*

Don Cohen et al.; Automatic Monitoring of Software Requirements; 1997 ICSE; pp. 602-603; <http://dl.acm.org/citation.cfm?id=253493>.*

Vincent Lestideau et al.; Towards automated software component configuration and deployment; 2002 PDTSD Orlando; 6 pages; <http://www-adele.imag.fr/Les.Publications/intConferences/PDTS2002Les.pdf>.*

* cited by examiner

SYSTEMS AND METHODS FOR INSTALLING, MANAGING, AND PROVISIONING APPLICATIONS

RELATED U.S. APPLICATION

This application is related to U.S. application Ser. No. 13/631,177, filed Sep. 28, 2012, U.S. application Ser. No. 13/631,323, filed Sep. 28, 2012, and U.S. application Ser. No. 13/631,380, filed Sep. 28, 2012. The applications are incorporated herein by reference for all purposes.

BACKGROUND

1. Field of the Invention

This invention relates to systems and methods for managing an application installation and associated resources.

2. Background of the Invention

Today's applications are very complex both in terms of actual functionality and in the number of components that must interact in order to provide a computing service. In particular, applications often require various external resources to facilitate their operation. Often, these resources are standardized software modules or systems such as databases, web servers, and the like. The deployment of applications has also recently been facilitated by using commoditized services such as a "Platform as a Service" (PaaS) that provides a computing platform as well as one or more software modules such as an operating system, web server, database, programming languages, and other resources. Application resources may also be provided using infrastructure as a service (IaaS) in which computers, either actual or virtual, are provided for use over a network.

The following detailed description provides improved systems and methods for instantiating and managing resources for use by an application and adapting these resources in accordance with loading of an application.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
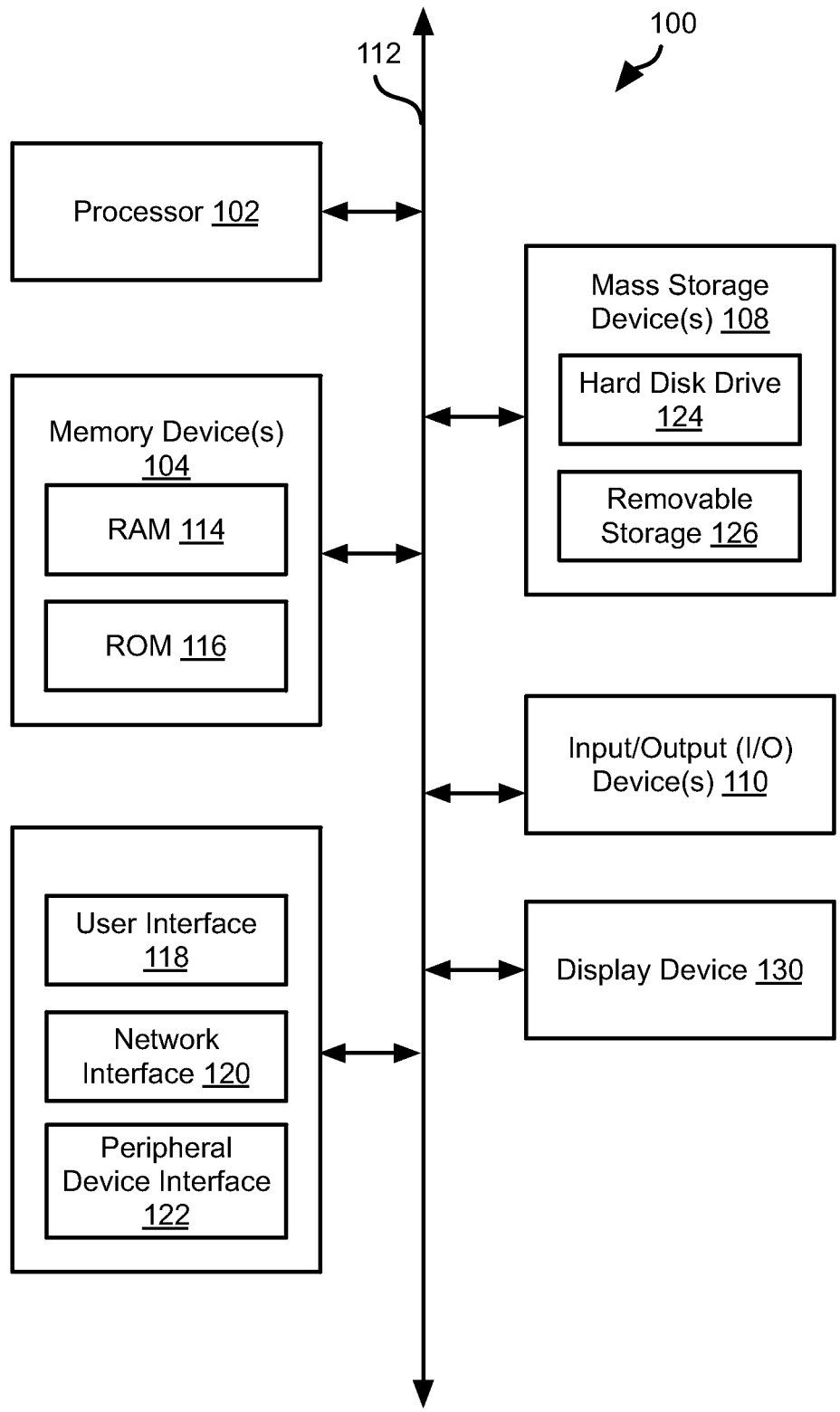
FIG. 1 is a block diagram of a computing device suitable for implementing embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for provisioning an application in accordance with an application manifest.

An application may have, in addition to any instructions for actually installing the application, an application manifest defining the provisioning of resources for the application. The application manifest may define logical requirements of the application. These logical requirements may then be mapped to actual physical components, such as using a platform as a service (PaaS) system. These physical components may include physical infrastructure such as some or all of computational components (e.g. processors), network components, and storage components. Other resources provisioned by the PaaS in accordance with the manifest may include application infrastructure such as operating systems, container runtimes, configuration of databases, certificate configuration, and the like. The resources that are provisioned may be external to the actual device on which the application is installed. For example, provisioned resources may include databases, application servers, web servers, computing resources, and the like. Methods are disclosed for dynamically provisioning an application using instructions provided in the application manifest and data regarding loading of the resources.

In use the application manifest is analyzed, such as by a PaaS system, to create the necessary network of the above-referenced resources in accordance with the manifest. Analytics and a real-time logging framework sense possible issues in the application and, for example, scale up or scale down provisioning of one or more resources, such as an allocation of CPUs in a CPU cluster in accordance with events. Such events may include detecting average CPU and requests across the cluster being greater or lower than a threshold.

An application manifest may be organized in a manifest tree with top resources having their own manifests that provision other resources, that may likewise have manifests, and so on. The manifest tree may be analyzed to identify dependencies and a deployment plan may be automatically generated according to the manifest tree. The manifest tree may also be used to determine root cause analysis in the event of a failure Also disclosed is a system and method for rolling out a software module across a plurality of nodes. A system and method are also disclosed for testing workflow paths operating on production data.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
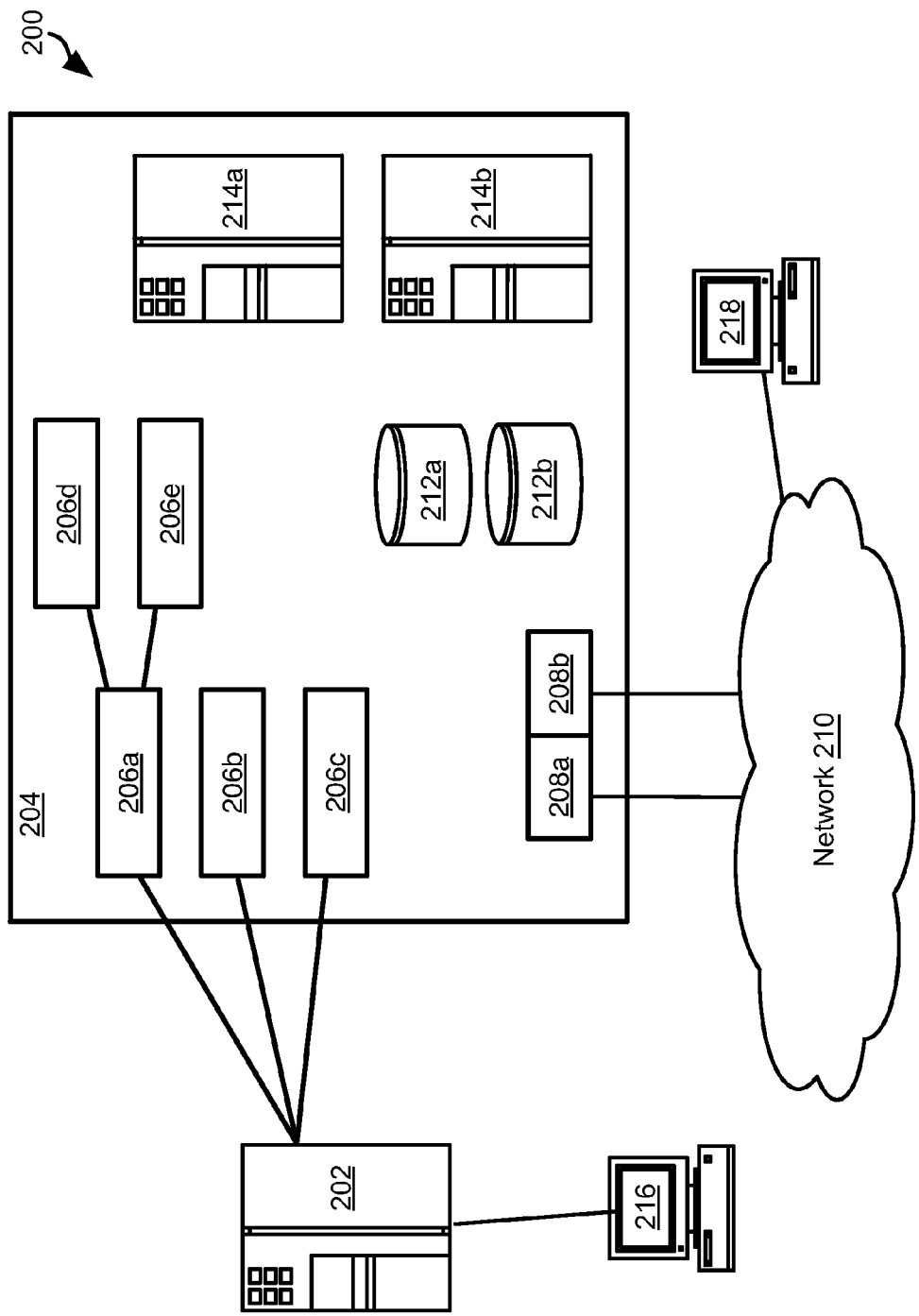
FIG. 2 is a block diagram of a network environment suitable for implementing embodiments of the present invention.

FIG. 2 illustrates a networked environment suitable 200 suitable for implementing some or all of the methods disclosed herein. The network environment may include a deployment server 202. The deployment server 202 may process application manifests in order to implement methods described herein. The deployment server 202 may interact with an installation 204 including one or more computing nodes 206a-206e. The deployment server may manage one or more of installation of applications and software modules on the nodes 206a-206e, provisioning of resources for applications installed on the nodes 206a-206e, monitoring execution of the installed applications, and dynamically adjusting provisioning for the installed applications.

The installation 204 may include one or more resources that may be provisioned for applications executing on the nodes 206a-206e according to the methods described herein. The resources may include, for example, one or more network resources 208a-208b for facilitating communication over a network 210, such as web servers, or the like. The resources may include one or more database or storage resources 212a-212b, such as a Cassandra database, SQL database, MySQL database, or other database system. The resources may also include computing resources 214a-24b such as application servers, virtual machines, Java runtime environments (JRE), or the like.

The installation 204 may be coupled to the network 210, such as a local area network (LAN), wide area network (WAN), or the Internet. A developer or administrator may interact with one or both of the deployment server 202 and installation 204 by means of a workstation 216 operably coupled to one or both of the deployment server 202 and the installation 204. External users may use services provided by the installation 204 by means of a workstation 218 operably coupled to the network 210. The workstations 216, 218 may be embodied as general-purpose computers, tablet computers, smart phones, or other computing devices. Any of the computing devices of the networked environment 200 may include some or all of the attributes of the computing device 100 as described hereinabove.

Figure 3A:
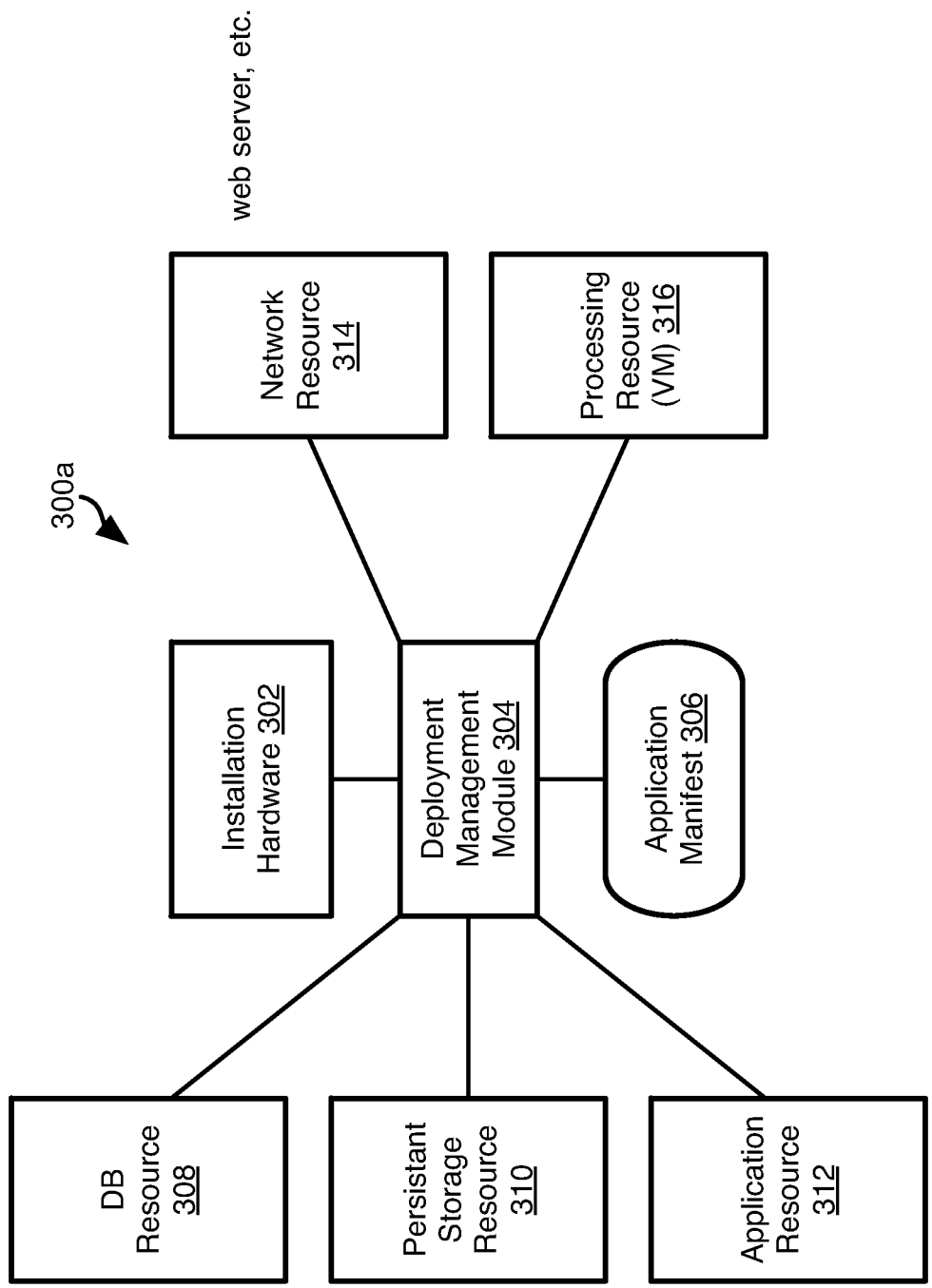
FIG. 3A is a block diagram of modules suitable for use in an installation provisioning system in accordance with an embodiment of the present invention.

FIG. 3A illustrates modules that may be used to implement methods described hereinbelow. For example, an application may be installed on installation hardware 302 that may include one or more computers. A deployment management module 304 that may be executed by the same computers or a separate server consumes an application manifest 306. The application manifest 306 defines resources that are to be provisioned for an application installed or to be installed on the installation hardware 302. The deployment management module 304 may be operably coupled to one or more devices or resources that may be used to meet the provisioning requirements of the application manifest 306.

In some embodiments, the resources may include one or more database resources 308, one or more persistent storage resources 310 (e.g. archiving), one or more application resources 312, one or more network resources 314, and one or more processing resources 316.

The application resources 312 may include one or more instances of service applications that may be used by an application. Any application for which another application may act as a client may be used as an application resource. An application resource 312 may include an instance of an application server, such as a JBoss server. A network resource 314 may include an allocation of network bandwidth or hardware such as switches or routers. A network resource 314 may also include networking software such as a web server or other networking application. A processing resource 316 may include access to or an allocation of processing time on a computing resource. A processing resource 316 may include a computer, virtual machine, runtime environment (e.g. a Java runtime environment JRE), or the like. A processing resource 316 may include some or all of the functionality of a platform as a service (PaaS) system. A processing resource 316 may include a servlet, such as a Java servlet or Tomcat servlet.

Figure 3B:
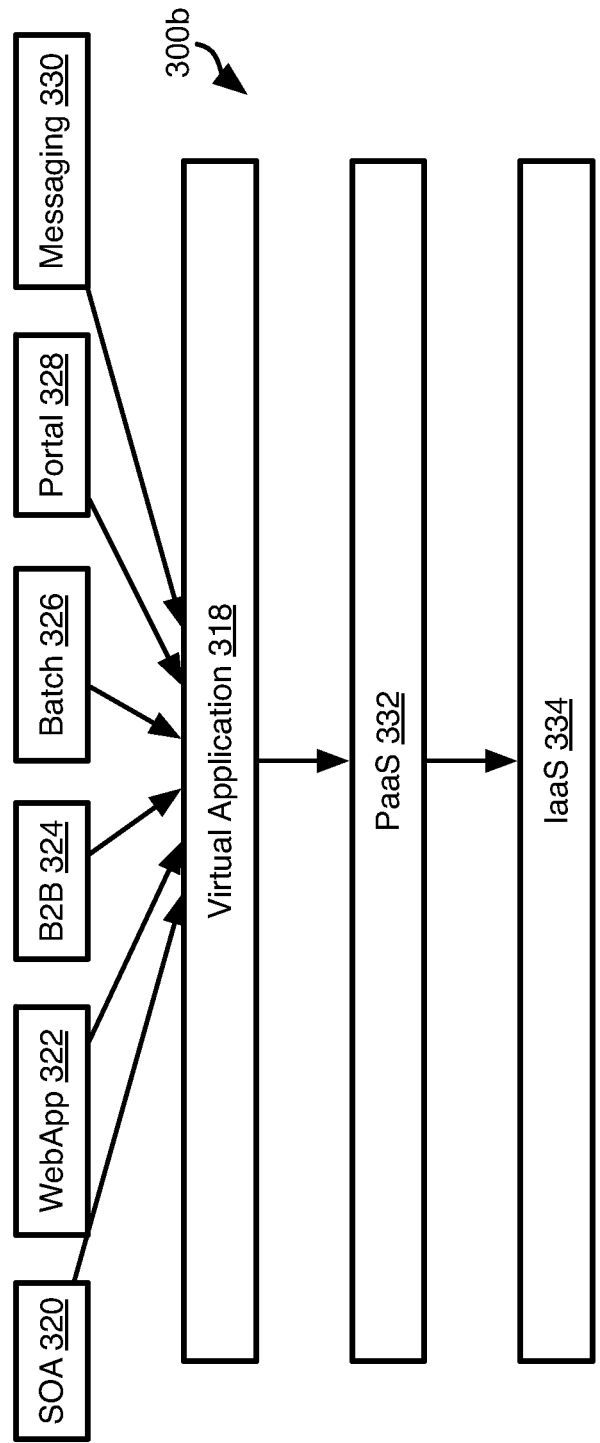
FIG. 3B is a block diagram of a platform suitable for implementation in accordance with an embodiment of the present invention.

FIG. 3B illustrates an embodiment of a platform 300b suitable for provisioning in accordance with the methods described herein. The platform 300b may provide an execution environment for a virtual application 318. The virtual application 318 may generate workloads that may be handled using resources provisioned according to methods described herein. For example, workloads may include a service oriented architecture (SOA), a web application 322 that may require a servlet container, a business-to-business (B2B) style workload, a batch processing workload 326 for back-end type workloads, a portal 328 to provide interactivity, and messaging workloads 330.

The virtual application 318 may execute within a platform as a service (PaaS) environment 332. Resource as provisioned according to the methods described herein may be associated with the PaaS in order to make the resources available to the virtual application. As known in the art the PaaS may offer some or all of the software modules and functionalities forming the solution stack of a PaaS as known in the art. For example, the PaaS may provide an execution environment including security, programming language support, database integration, and other functionality. In some embodiments the PaaS may be implemented on an infrastructure as a service (IaaS) platform 334. In a like manner, resources used to provided the IaaS platform may be provisioned according to methods described herein for supporting execution of the virtual application 318.

Figure 4:
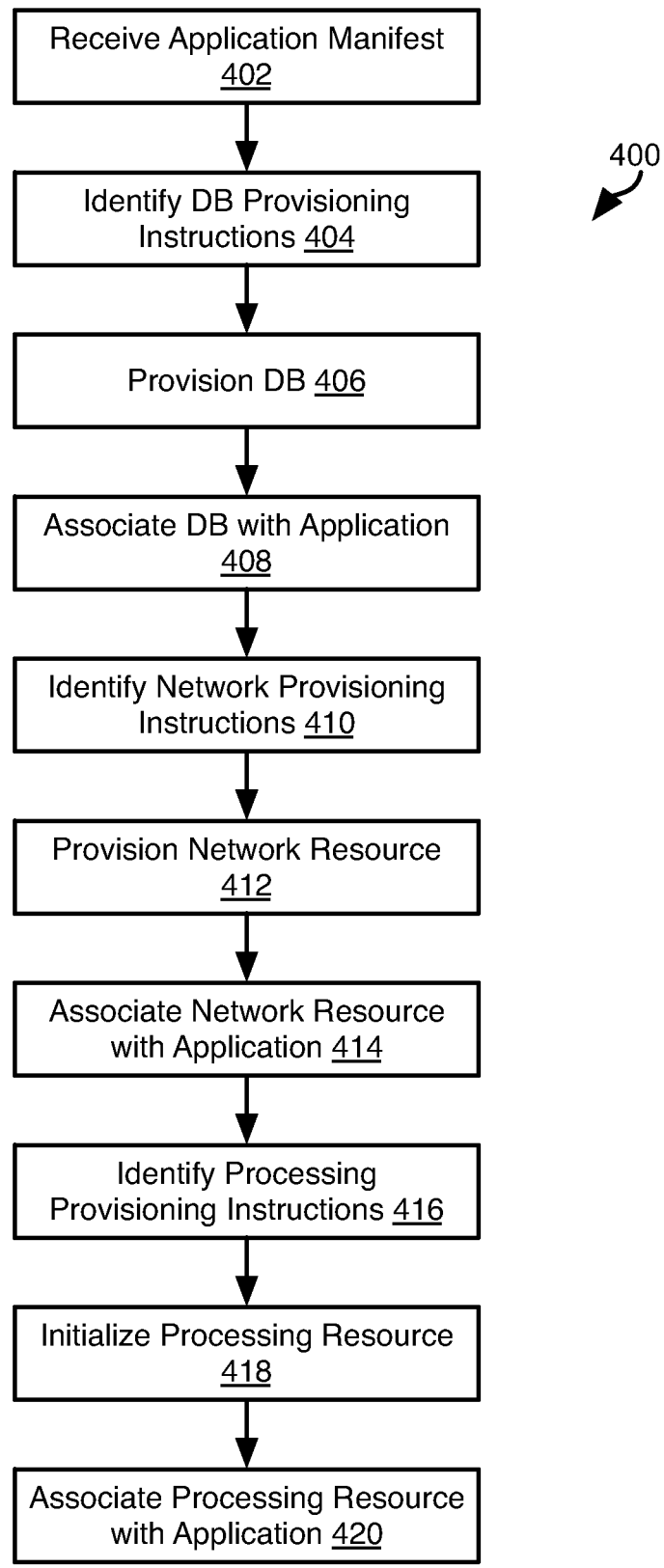
FIG. 4 is a process flow diagram of a method for provisioning an application according to a manifest in accordance with an embodiment of the present invention.

FIG. 4 illustrates a method 400 for provisioning an application using an application manifest. The method 400 may be executed after an application has been installed on one or more installation platforms, during the installation process, or prior to installation.

The method 400 may include receiving 402 an application manifest. As noted above, the application manifest defines resources to be provisioned for the application. Accordingly, the method 400 may further include identifying 404 instructions in the application manifest for provisioning one or more databases. The instruction to provision a database may define one or more parameters that define the database, such as the size of the database and the type of database, such as Oracle, IBM DB2, Microsoft SQL Server, Microsoft Access, PostgreSQL, MySQL, SQLite, and the like. The parameters defined in the application manifest for instantiating the database of the specified type may be any of the parameters used to instantiate or otherwise setup a database according to the specification for that type of database.

Any database as described in the application manifest may then be provisioned 406 and then associated 408 with the application. Provisioning 406 may include instantiating the database according to the parameters of the application manifest. Associating 408 the database with the application may include providing sufficient information to the application to access the database.

The method 400 may further include identifying 410 any instructions in the application manifest to provision one or more network resources. The one or more network resources to be provisioned may include some or all of the network resources identified hereinabove. For example, the network resource may include a web server, router, switch, domain name server (DNS), or other network resource. The parameters to define the network resource may be as known in the art for the given resource and may be specified in the application manifest. The method 400 may then include provisioning 412 or otherwise instantiating and initializing the identified 410 network resources. The network resources may then be associated 414 with the application. Associating 414 the resource with the application may include notifying the application of the network resource and/or providing sufficient information to the application to allow the application to access the network resource.

The method 400 may additionally include identifying 416 any instructions in the application manifest to provision one or more processing resources. The one or more processing resources may include any of the processing resources described above. For example, the processing resources may include a virtual machine, an application server, an application to be provided by an application server, and the like. The application manifest may include parameters needed to instantiate or otherwise initialize the processing resource as defined by the specification for the processing resource. The one or more processing resources may then be initialized 418 according to any parameters defined in the application manifest and the one or more processing resources may be associated 420 with the application. Associating the one or more processing resources with the application may include informing the application of the processing resource or otherwise providing information to the application sufficient for the application to access the resource.

In addition to the foregoing steps, the application manifest may also define environmental variables or other system configuration parameters for one or both of the system on which the application is installed and the systems hosting any of the resources instantiated or otherwise initialized according to the method 400. The method 400 may therefore additionally include setting these environmental variables, system configuration parameters, and any other instructions for configuring an application or resource hosting system.

Figure 5:
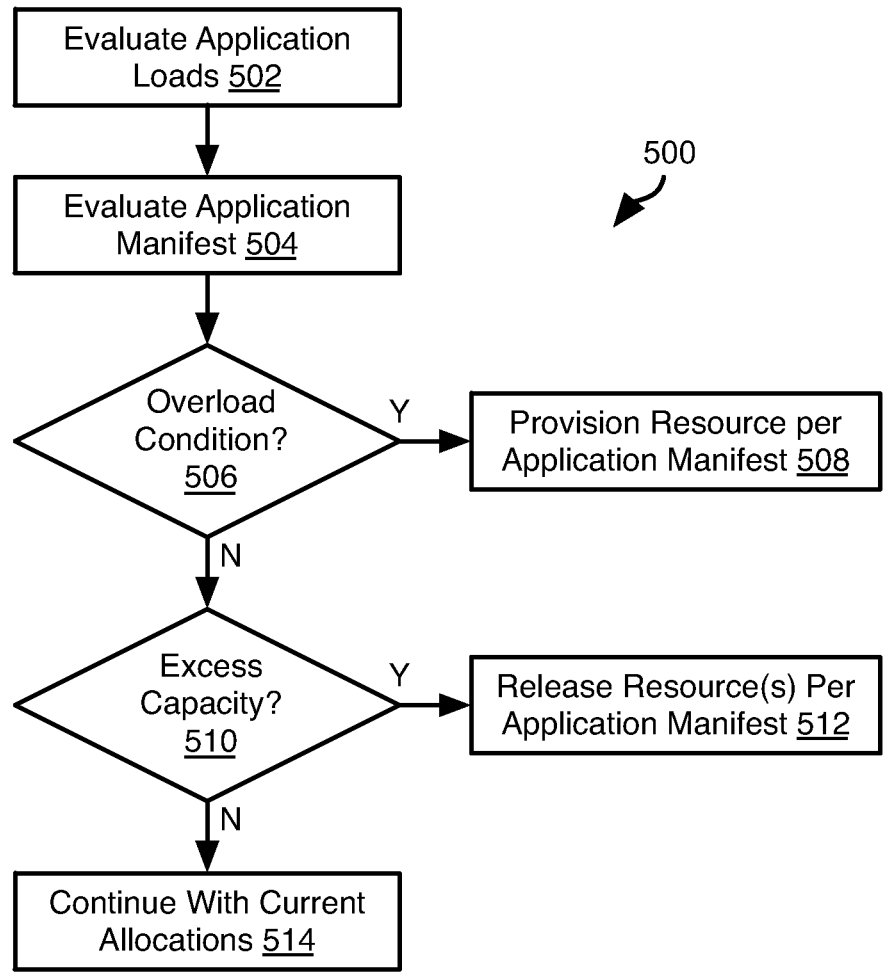
FIG. 5 is a process flow diagram of a method for dynamically provisioning an application according to an application manifest in accordance with an embodiment of the present invention.

Referring to FIG. 5, an application manifest may additionally include instructions for managing provisioning of an application throughout an operational life of the application. Accordingly, the method 500 of FIG. 5 may be executed continuously or periodically with respect to an application. In some embodiments, the method 500 may include evaluating 502 application loads. Evaluating 502 application loads may include evaluating one or both of loading of the application and the one or more resources provisioned according to the methods described herein. One or both of the application and resource loads may additionally be evaluated 504 with respect to the application manifest.

In some embodiments, an application manifest may define programmatic instructions defining adjustments to provisioning of some or all of the resources that may be provisioned according to an application manifests in order to provide capacity management, service level agreements, traffic management, resource allocation, and the like. The instructions may define a correspondence between adjustments to provisioning of the resources and the loading of the resources. The instructions may be as complex as allowable by scripting and programming languages and may specify dependencies and interrelationships between loading of different resources. Adjustments that may be made include augmenting resources according to overloading and releasing or otherwise de-provisioning some or all of a resource according to under-utilization of the resource.

As an example, the method 500 may include evaluating 506 whether an overload condition exists for a resource, such as a database, network, or processing resource that could be provisioned according to methods described herein. If so, then an additional amount or additional instances of the overloaded resource may be provisioned 508 in accordance with the application manifest. Provisioning additional resources may include performing some or all of the steps described in the method 400 for provisioning a resource for an application, including instantiating or otherwise initializing the resource according to parameters defined by the application manifest and associating the resource with the application.

In a like manner, the method 500 may include evaluating 510 whether there exists an excess capacity for a resource. If so, then a quantity or number of instances of the resource may be released 512 or otherwise de-provisioned from the application as programmatically defined by the application manifest.

If no overloading or underloading is found 506, 510, then processing may continue 514 with current allocations of resources. Various modifications and refinements of the method 500 may be used. As already noted, any scripting or programming functionality may be used to define actions to be taken in response to measured loading. In addition, in some embodiments, "freeze" dates may be defined by a system processing the application manifest or the manifest itself. A freeze date may define a date or date range in which adjustments to the provisioning of an application are not permitted. For example, at critical times the risk of error or the processing required to adjust provisioning may be avoided in order to prevent interference with processing of the application. In some embodiments, historical loading may also be used to anticipate loading and adjust provisioning of an application, such as in accordance with the method 500, with the exception that the loads being evaluated are anticipated loads.

Figure 6:
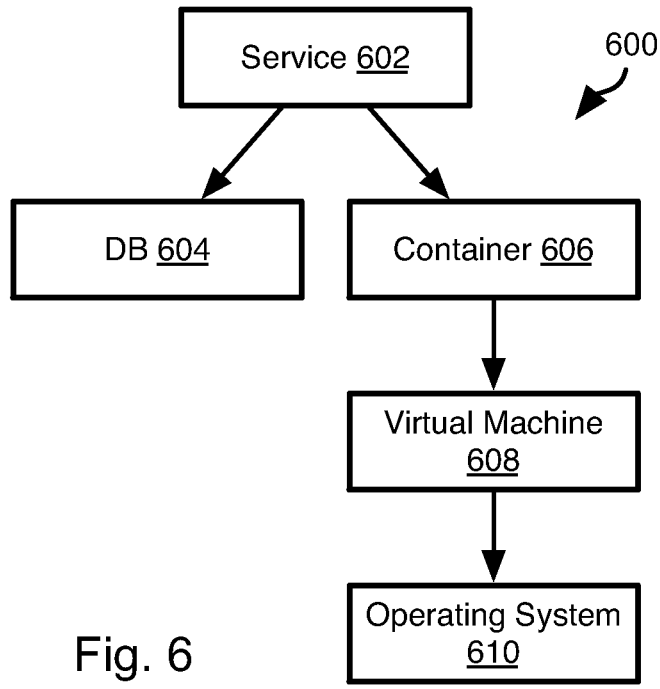
FIG. 6 is a block diagram illustrating resource dependencies in accordance with an embodiment of the present invention.

Referring to FIG. 6, a resource provisioned according to the methods described herein may itself have one or more resources provisioned therefore according to an application manifest. Accordingly, a manifest tree 600 may be defined for an application. For example, a top-level resource, such as some type of service 602, may be provisioned in an application manifest for an application. The service 602 may include an application manifest that provisioned one or more sub-resources, such as a database 604 and a container 606. In turn, these sub-resources may have application manifests associated therewith that define corresponding sub-sub-resources, and so on. For example, the container 606 may require provisioning of a virtual machine 608 that may in turn require an instance of an operating system 610.

Figure 7:
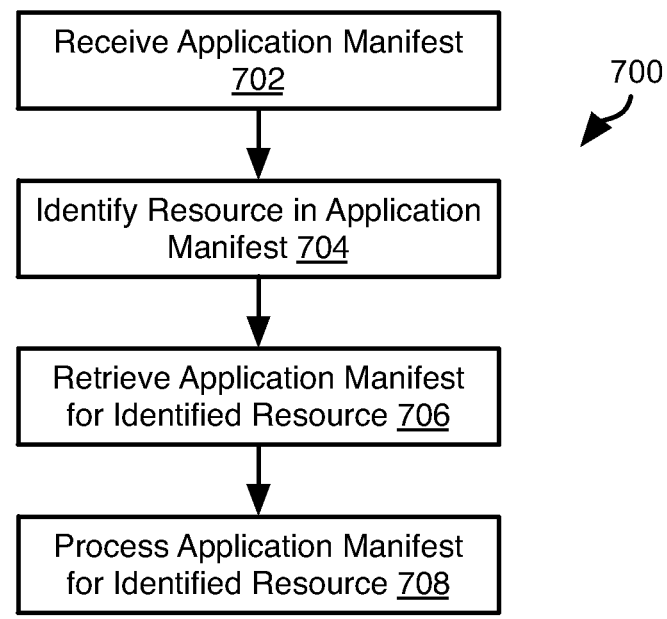
FIG. 7 is a process flow diagram of a method for processing an processing an application manifest tree in accordance with an embodiment of the present invention.

FIG. 7 illustrates a method 700 for provisioning an application having an application manifest associated therewith that defines a manifest tree as discussed above. The method 7 may be executed as part of processing an application manifest according to any of the methods described herein, including the methods of FIGS. 4 and 5.

The method 700 may include receiving 702 and identifying 704 resources to be provisioned according to the application manifest. For each of these resources, the resource may either be provisioned directly in accordance with parameters defined in the application manifest or an application manifest for that resource may be retrieved 706 and processed 708. Processing 708 may include either provisioning the resource according to parameters in the application manifest according to methods described herein or executing the method 700 for each resource to be provisioned that has a corresponding application manifest or application manifest tree associated therewith.

Figure 8:
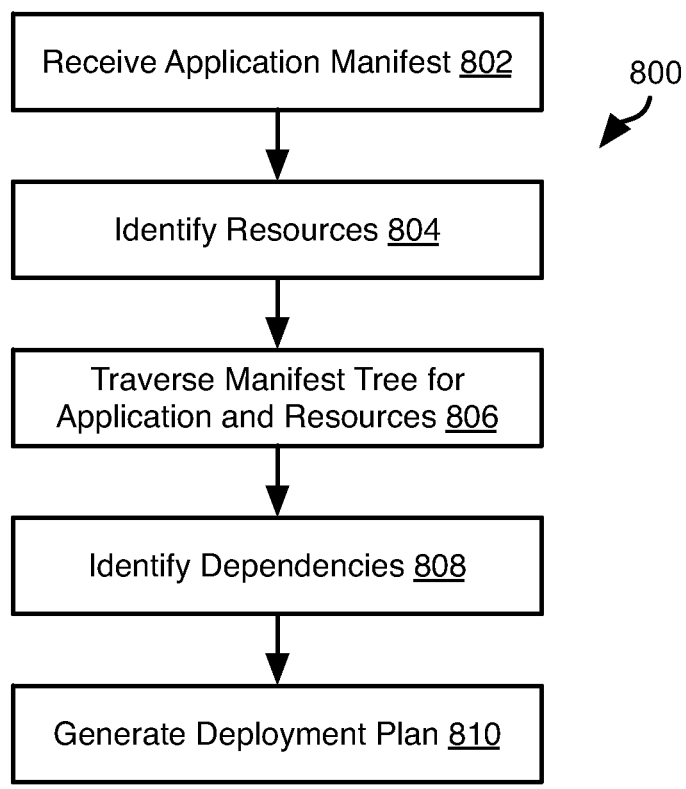
FIG. 8 is a process flow diagram illustrating a method for generating a deployment plan according to a manifest tree in accordance with an embodiment of the present invention.

Referring to FIG. 8, a manifest tree may be used to develop a deployment plan for provisioning an application. As already noted, provisioning of a resource may include processing an application manifest for the resource that defines provisioning of sub-resources for the resource such that a manifest tree is defined. A method 800 may include receiving 802 an application manifest and identifying 804 top-level resources defined in the application manifest. The manifest tree for these top-level resources may then be traversed 806 and dependencies 808 identified. A deployment plan for the resources to be provisioned according to the manifest tree may then be generated 810 that satisfies the identified dependencies. Dependencies may include ensuring that the lowest level resources in the manifest tree are provisioned first. The deployment plan may then be followed when provisioning the application. Accordingly, the actual provisioning of an application may include following the deployment plan in order to implement the application manifest. The deployment plan may be in the form of a script that is executed to provision resources in the proper order in accordance with the type of resources. For example, in a tree including resources with sub resources that need to be provisioned, some types of resources may require instantiating of the sub resource before instantiating of the resource whereas for others the reverse is true. The deployment plan may therefore instantiate resources in the proper order.

Figure 9:
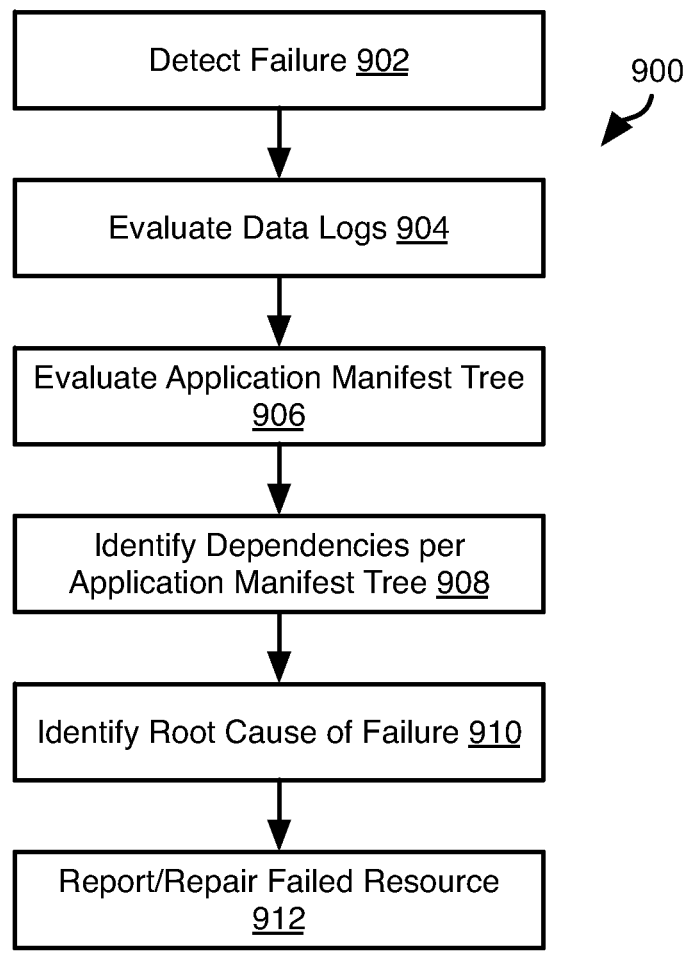
FIG. 9 is a process flow diagram illustrating a method for performing root cause analysis according to a manifest tree in accordance with an embodiment of the present invention.

Referring to FIG. 9, a manifest tree may be used to perform root cause analysis of a system including an application and one or more resources provisioned according to a manifest tree as described hereinabove. As noted above, the manifest tree defines resources and resources that are provisioned for use by resources in a hierarchical manner. The knowledge of the hierarchical nature of the resources and the dependencies in accordance with the application manifest and corresponding manifest tree may be used to perform root cause analysis of failures.

For example, a method 900 may include detecting 902 failure in a system including an application and one or more resources provisioned for the application according to an application manifest of the application. Data logs and other alerts documenting the system performance may be evaluated 904 and evaluating 906 the manifest tree for the system. Dependencies among resources and between the application and resources may be identified 908 according to the manifest tree. Error messages and other data indicating failure may then be analyzed in view of the identified dependencies in order to identify 910 a root cause of the detected failure. In some embodiments, the failed resource may be reported 912 and/or repaired or replaced. Replacement of the failed resource may be in accordance with the manifest that was used to originally provision the failed resource.

Figure 10:
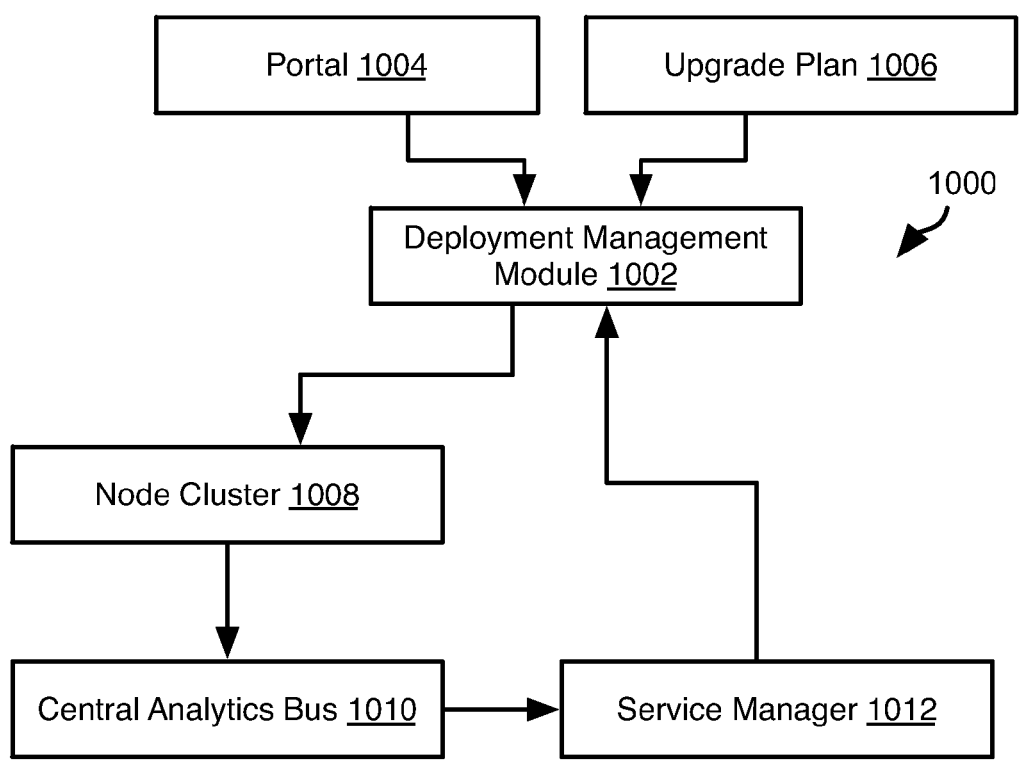
FIG. 10 is a block diagram of a system for orchestrating rollout of a software module in accordance with an embodiment of the present invention.

FIG. 10 illustrates a system 1000 for orchestrating rollout of a software module, such as an application or resource having a corresponding application manifest as described herein. The system 1000 may be used for rolling out a software module across a plurality of nodes. The system 1000 may include a deployment management module 1002 that may be hosted on a node of the plurality of nodes or a separate server. Instructions invoking the functionality of the deployment management module 1002 may be received from a portal 1004. In some embodiments, instructions received from the portal 1004 may invoke performance of an upgrade plan 1006 by the deployment management module 1002. The upgrade plan 1006 may simply be an application manifest to be processed for each node. The upgrade plan 1006 may define what modules are to be installed on each node.

The deployment management module 1002 may be operably coupled to a node cluster 1008 on which a software module is to be installed. Performance of the node cluster may be monitored by one or more systems, such as a central analytics bus 1010. In some embodiments, a service manager 1012 received performance data from the central analytics bus and provides reports to the deployment management module 1002.

Figure 11:
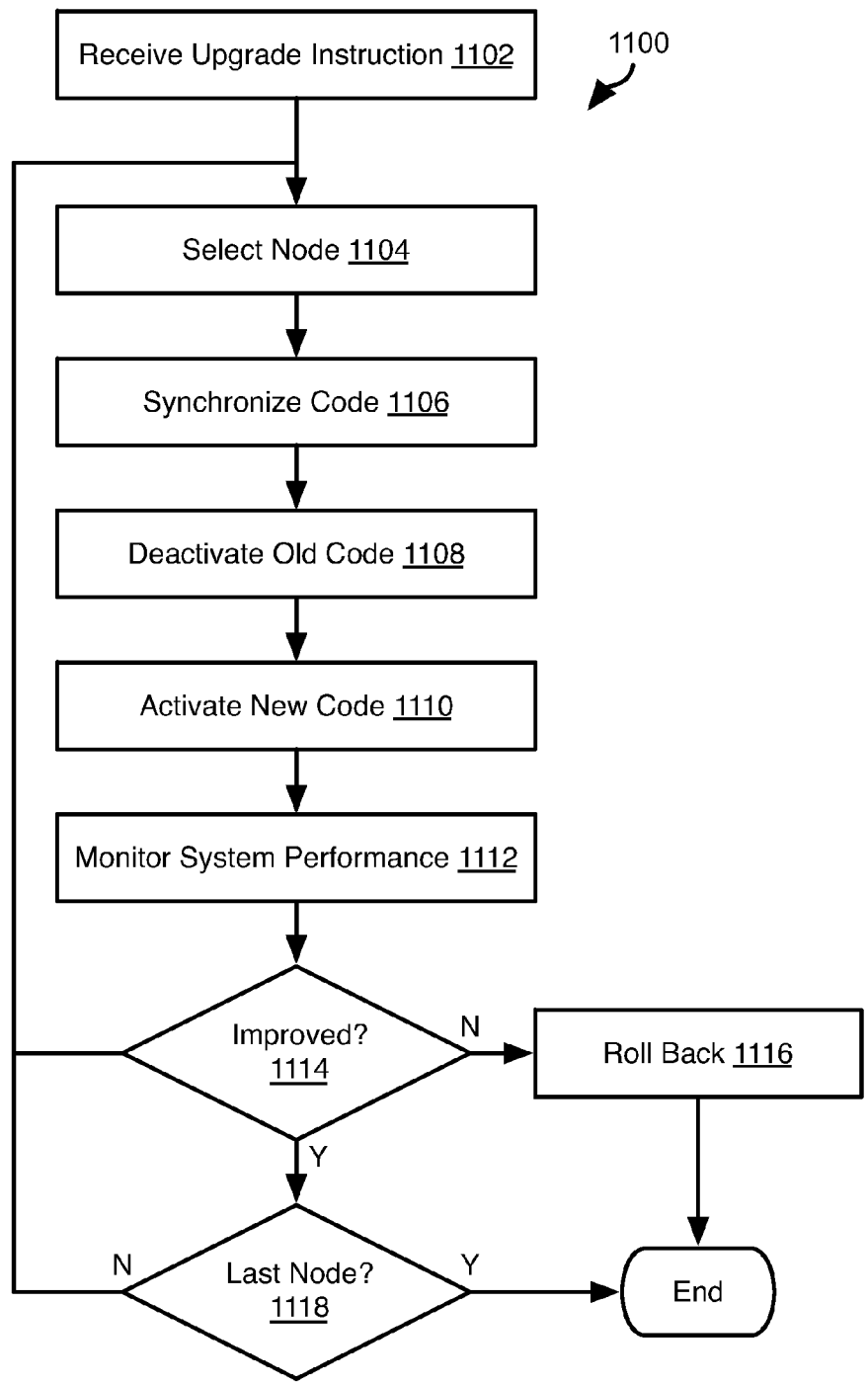
FIG. 11 is a process flow diagram of a method for orchestrating rollout of a software module in accordance with an embodiment of the present invention.

Referring to FIG. 11, the system 1000 may be used to implement the illustrated method 1100 for rolling out a software module, such as an upgrade of a prior software module. In particular, a deployment management module 1002 may manage execution of the method 1100.

The method 1100 may include receiving 1102 an instruction to upgrade one or more software modules on one or more nodes of a node cluster 1008. The instruction may be received through a portal 1004 and may include or invoke an upgrade plan 1006. The method 1100 may further include orchestrating an upgrade according to the upgrade plan. For example, the method 1100 may include selecting 1104 a node from the node clusters 1008 and synchronizing 1106 code of the selected node. This may include ensuring that current versions of one or more software modules to be upgraded are stored on the selected node. The former code corresponding to the one or more software modules to be upgraded may be deactivated 1108 and the upgraded one or more software modules may be activated 1110. The steps of synchronizing 1106 the new code and activating the new code 1110 may include some or all of the steps known in the art for installing an application or other software module. These steps may also include processing an application manifest according to some or all of the methods described herein.

The performance of the selected node may be monitored 1112. Any aspect known in the art to reflect on the operation of a computer system or software module executing on a computer system may be monitored 1112. This may include processor and memory usage, the number of objects instantiated, the number of database or other calls made, and the like. Referring back to FIG. 10, the central analytics bus 1010 may collect performance data and provide it to a service manager 1012. Reports generated by the service manager 1012 may be used to perform monitoring 1112 of system performance.

The method 1100 may additionally include evaluating 1114 whether performance of the selected node, as measured according to some or all of the foregoing metrics, has improved. If not, then the upgrade may be rolled 1116 back, such as by deactivating the new one or more software modules and reactivating any former software modules. If performance is found 1114 to have improved and nodes are found 1118 to remain that need to be upgraded, then the method may include selecting 1104 another node and processing may continue as shown in FIG. 11. Otherwise, the method 1100 may end.

Figure 12:
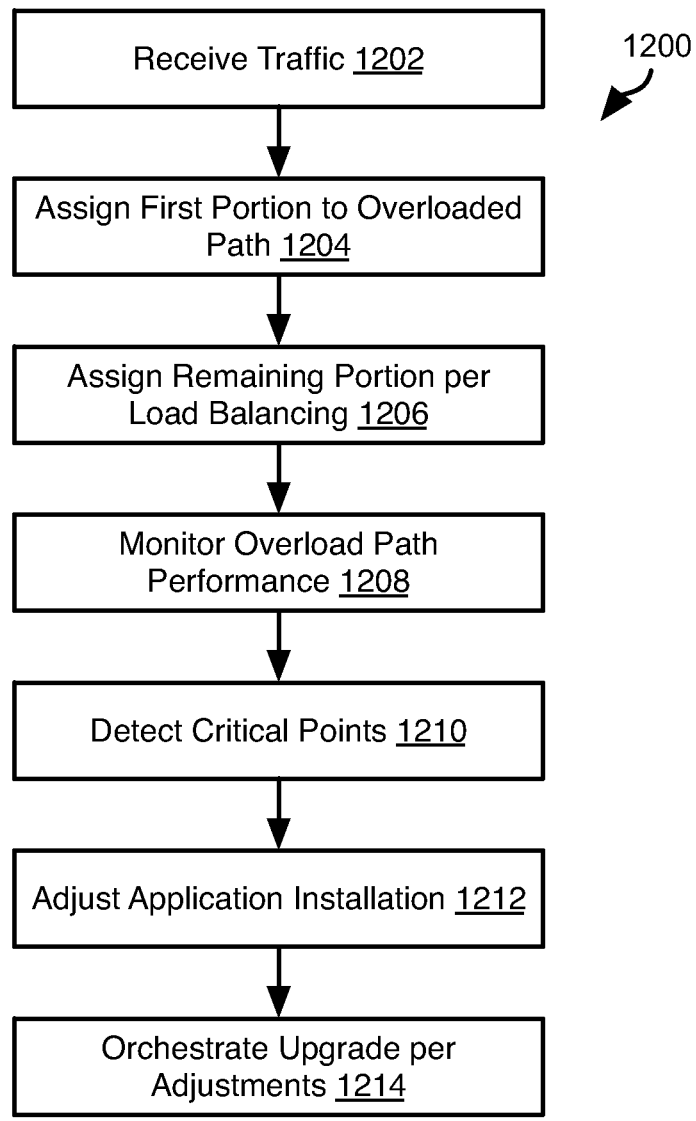
FIG. 12 is a process flow diagram of a method for testing an installation in accordance with an embodiment of the present invention.

FIG. 12 illustrates a method 1200 for evaluating a workflow path, software module, application, or other system. The method 1200 may include receiving 1202 traffic. The traffic may be external to the system that is the subject of the method 1200 and may include requests for one or both of processing and data from one or more users. The system under test may include multiple workflow paths that include one or more resources that interact with one another to process instructions received as a result of the traffic 1202. The workflow paths may include one or both of a chain of multiple computer systems or devices and multiple software modules executing in one or more separate processes or threads on the same computer system. For example, a workflow path may include an application and resources provisioned for that application according to the methods described herein.

A first portion of the traffic may be assigned 1204 to an overloaded path and a remaining portion of the traffic may be assigned 1206 to other workflow paths according to a load balancing approach. The amount of traffic assigned 1204 to the overloaded path may be greater than the amount assigned 1206 to other workflow paths according to a load balancing approach. The amount of traffic assigned 1204 to the overloaded path may be a specified percentage of received traffic, a specified percentage above the average amount of traffic assigned to other workflow paths, or may be dynamically determined based on monitored performance of the overloaded path or based on some criteria. For example, the amount of traffic sent to the overloaded path may be increased until failure occurs.

The method 1200 may further include monitoring 1208 performance of the overloaded path. This may include any of the metrics mentioned hereinabove with respect to the method 1100 of FIG. 11. The data gathered according to the monitoring 1208 may be used 1210 to detect critical points 1210 in the overloaded path. In particular, under an overload condition, this may include identifying the resources, software modules, components, or other aspects of the overloaded path that are stressed to the point of failure or otherwise lack the ability to perform their function at a rate sufficient to deal with the received traffic. For example, an overload condition may include failure to meet a specified quality of service (QoS) as defined according to any criteria of interest to a developer or user.

In some embodiments, the identified critical points or other data regarding system performance of the overloaded path may simply be reported to a developer or administrator. In other embodiments, one or more processing steps may be performed to automatically adjust the workflow path for one or both of the overloaded path and paths other than the overloaded path. For example, the application installation may be adjusted 1212 and then an upgrade of the nodes of the system may be orchestrated 1214, such as according to the method 1100. In some embodiments, the overloaded path may first be adjusted and subsequent paths may be upgraded in a similar manner if performance of the overloaded path is found to have improved due to the adjustments. In some embodiments, the adjustments of step 1212 may include adjustments to an application manifest, such as increasing or decreasing provisioning of resources detected 1210 as being critical according to the detection step 1210.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for installation management, the method comprising:
    installing an application on installation hardware;
    evaluating, by a provisioning server having one or more processors, a first application manifest associated with the application, the first application manifest including a manifest tree having manifests as nodes thereof, each manifest defining instantiation of a resource, a child node of each node being the manifest of the manifests for a sub-resource of the each node;
    traversing, by the provisioning server, the manifest tree and identifying dependencies between resources instantiated by the manifest tree by evaluating the manifest of each node of the manifest tree and determining resources required for implementation of the manifest for the each node;
    automatically evaluating, by the provisioning server, the dependencies for the manifest of each node of the manifest tree and automatically ordering execution of the manifests of the manifest tree and automatically generating a deployment plan in accordance with the ordering;
    in accordance with the ordering specified in the deployment plan, provisioning, by the provisioning server, the resources; and
    associating, by the provisioning server, the resources with the application.

2. The method of claim 1, wherein the resources include at least one database.

3. The method of claim 2, wherein the at least one database is a Cassandra™ database.

4. The method of claim 1, wherein the resources include at least one processing resource.

5. The method of claim 1, wherein the resources include at least one storage resource.

6. The method of claim 1, wherein the resources includes an application server.

7. The method of claim 6, wherein the application server is a JBoss™ server.

8. The method of claim 1, wherein the resources include a processing resource.

9. The method of claim 1, wherein the processing resource includes a Tomcat™ server.

10. A system for installation management, the system comprising one or more processors and one or more memory devices operably coupled to the one or more processors, the one or more memory devices storing executable and operational code effective to cause the one or more processors to:

install an application on installation hardware;

evaluate a first application manifest associated with the application, the first application manifest including a manifest tree having manifests as nodes thereof, each manifest defining instantiation of a resource, a child node of each node being the manifest of the manifests for a sub-resource of the each node;

traverse the manifest tree and identifying dependencies between resources instantiated by the manifest tree by evaluating the manifest of each node of the manifest tree and determining resources required for implementation of the manifest for the each node;

automatically evaluating the dependencies for the manifest of each node of the manifest tree and automatically ordering execution of the manifests of the manifest tree and automatically generating a deployment plan in accordance with the ordering;

in accordance with the ordering specified in the deployment plan, provision the resources; and associate the resources with the application.

11. The system of claim 10, wherein the resources include at least one database.

12. The system of claim 11, wherein the at least one database is a Cassandra™ database.

13. The system of claim 10, wherein the resources include at least one processing resource.

14. The system of claim 10, wherein the resources include at least one storage resource.

15. The system of claim 10, wherein the resources includes an application server.

16. The system of claim 15, wherein the application server is a JBoss™ server.

17. The system of claim 10, wherein the resources include a processing resource.

18. The system of claim 10, wherein the processing resource includes a Tomcat™ server.

* * * * *